(12) United States Patent
Katano

(10) Patent No.: US 8,221,927 B2
(45) Date of Patent: Jul. 17, 2012

(54) FUEL CELL SYSTEM

(75) Inventor: Koji Katano, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1223 days.

(21) Appl. No.: 10/592,936

(22) PCT Filed: Apr. 25, 2005

(86) PCT No.: PCT/IB2005/001101
§ 371 (c)(1),
(2), (4) Date: Sep. 15, 2006

(87) PCT Pub. No.: WO2005/104282
PCT Pub. Date: Nov. 3, 2005

(65) Prior Publication Data
US 2007/0243438 A1 Oct. 18, 2007

(30) Foreign Application Priority Data
Apr. 26, 2004 (JP) ................... 2004-130024

(51) Int. Cl.
*H01M 8/04* (2006.01)
(52) U.S. Cl. ...................... 429/440; 429/433
(58) Field of Classification Search .......... None
See application file for complete search history.

(56) References Cited

U.S. PATENT DOCUMENTS

| | | | | |
|---|---|---|---|---|
| 4,759,997 A * | 7/1988 | Ohyauchi et al. | ............ | 429/442 |
| 5,039,579 A * | 8/1991 | Kinoshita | ...................... | 429/410 |
| 5,084,362 A * | 1/1992 | Farooque | ...................... | 429/411 |
| 5,616,430 A | 4/1997 | Aoyama | | |
| 5,728,183 A * | 3/1998 | Greiner et al. | .................... | 48/61 |
| 6,815,103 B2 * | 11/2004 | Abe et al. | ........................ | 429/13 |
| 6,908,069 B2 * | 6/2005 | Kiku | ....................... | 251/129.11 |
| 7,235,217 B2 * | 6/2007 | Nguyen | ........................ | 422/198 |
| 2002/0146602 A1 | 10/2002 | Abe et al. | | |
| 2003/0031900 A1 | 2/2003 | Tajima et al. | | |
| 2003/0118883 A1 | 6/2003 | Breault et al. | | |
| 2003/0132315 A1 * | 7/2003 | Nau et al. | ...................... | 239/398 |

FOREIGN PATENT DOCUMENTS

DE 102 14 727 A1 1/2003
JP A-2002-313389 10/2002

* cited by examiner

*Primary Examiner* — Cynthia Lee
(74) *Attorney, Agent, or Firm* — Oliff & Berridge, PLC

(57) ABSTRACT

A fuel cell system including a fuel cell body; a first portion continuously supplied with heat following start up of the fuel cell body; a second portion continuously supplied with heat following start up of the fuel cell body; and a hydrogen exhaust valve. The first portion and the second portion are directly fixed to each other with the hydrogen exhaust valve disposed therebetween. The first portion is, for example, a gas-liquid separation unit supplied with heat from exhaust gas from the fuel cell body, and the second portion is, for example, a hydrogen processing unit supplied with heat from exhaust gas from the fuel cell body.

10 Claims, 4 Drawing Sheets

7   END PLATE

FUEL CELL SYSTEM

The disclosure of Japanese Patent Application No. 2004-130024 filed on Apr. 26, 2004, including the specification, drawings and abstract is incorporated herein by reference in its entirety.

BACKGROUND OF THE INVENTION

1. Field of the Invention

The invention relates to a fuel cell system provided with a hydrogen exhaust valve.

2. Description of the Related Art

In the fuel cell system field, fuel cells including an exhaust valve are known such as that disclosed in Japanese Patent Laid-Open Publication No. 2002-313389. This related technology focuses on the need to thaw a frozen hydrogen exhaust valve when the fuel cell is started up, and includes a warm-up box in which the hydrogen exhaust valve is disposed and into which high temperature air is fed.

However, with this related art, it is necessary to provide passages and perform control in order to feed the high temperature air into the warm-up box during the warm-up operation.

SUMMARY OF THE INVENTION

The invention has been conceived of in light of the aforementioned problems, and provides a technology with a simple structure that allows a frozen exhaust valve to be thawed when starting up a fuel cell (and which prevents freezing of the exhaust valve if it is about to freeze).

In an embodiment, which is one example of the invention, a fuel cell system is provided with a fuel cell body; a first portion continuously supplied with heat following start up of the fuel cell body; a second portion continuously supplied with heat following start up of the fuel cell body; and a hydrogen exhaust valve. In this fuel cell system, the first portion and the second portion are directly fixed to each other with the hydrogen exhaust valve disposed therebetween.

According to the above described fuel cell system, a configuration is provided in which the hydrogen exhaust valve is interposed between the first and second portions that are constantly supplied with heat following start up of the fuel cell. Accordingly, it is possible to thaw the exhaust valve following start up of the fuel cell (and, to prevent freezing of the exhaust valve if it is about to freeze).

Further, it is preferable that the first portion of the above fuel cell system is, for example, a gas-liquid separation unit supplied with heat from exhaust gas from the fuel cell body. However, this is merely one possible example of the first portion. Accordingly, the invention is no way limited to this embodiment, and, for example, the first portion may be an end plate provided in a stack configured as part of the fuel cell body, or another element.

Moreover, in the above fuel cell system, for example, the first portion may include a cover formed with an internal space that accommodates the hydrogen exhaust valve. Further, it is preferable that the first portion and the second portion are directly fixed to each other such that the second portion closes the internal space of the cover within which the hydrogen exhaust valve is disposed.

If this configuration is adopted, the internal space in which the hydrogen exhaust valve is disposed functions like a heat retaining chamber, which is extremely favorable for thawing the exhaust valve when starting up the fuel cell (and, for preventing freezing of the exhaust valve if it is about to freeze).

Further, it is preferable if the second portion in above the fuel cell system is, for example, a hydrogen processing unit supplied with heat from exhaust gas from the fuel cell body. In this case, the hydrogen processing unit may be, for example, a dilution unit or a combustion unit. Note that, this is just one example of the second portion.

It is favorable if a spring member is interposed between one of the hydrogen exhaust valve and the first portion, and the hydrogen exhaust valve and the second portion.

According to the fuel cell system with this configuration, the hydrogen exhaust valve is pushed against one of the first portion and the second portion by elastic force of the spring member. As a result, the hydrogen exhaust valve reliably abuts with the first portion or the second portion.

In addition, the hydrogen exhaust valve disposed between the first and second portions may be fixed to the first and second portions.

Further, it is preferable that seal mechanisms are respectively interposed between the hydrogen exhaust valve and the first portion, and between the hydrogen exhaust valve and the second portion.

In the above described configuration, the seal mechanism interposed between the hydrogen exhaust valve and the first portion and between the hydrogen exhaust valve and the second portion may be, for example, an O-ring. In this case, it is possible to inhibit leakage to the outside of the exhaust gas from the first portion, and also to inhibit leakage to the outside of the flow of gas from the hydrogen exhaust valve to the second portion.

The embodiment of the invention described above provides a simple structure that allows a frozen exhaust valve to be thawed when starting up a fuel cell (and which prevents freezing of the exhaust valve if it is about to freeze).

BRIEF DESCRIPTION OF THE DRAWINGS

The above mentioned and other features, advantages, technical and industrial significance of this invention will be better understood by reading the following detailed description of the exemplary embodiment of the invention, when considered in connection with the accompanying drawings, in which.

DETAILED DESCRIPTION OF THE PREFERRED EMBODIMENTS

In the following description and the accompanying drawings, the present invention will be described in more detail in terms of an exemplary embodiment.

Figure 1:
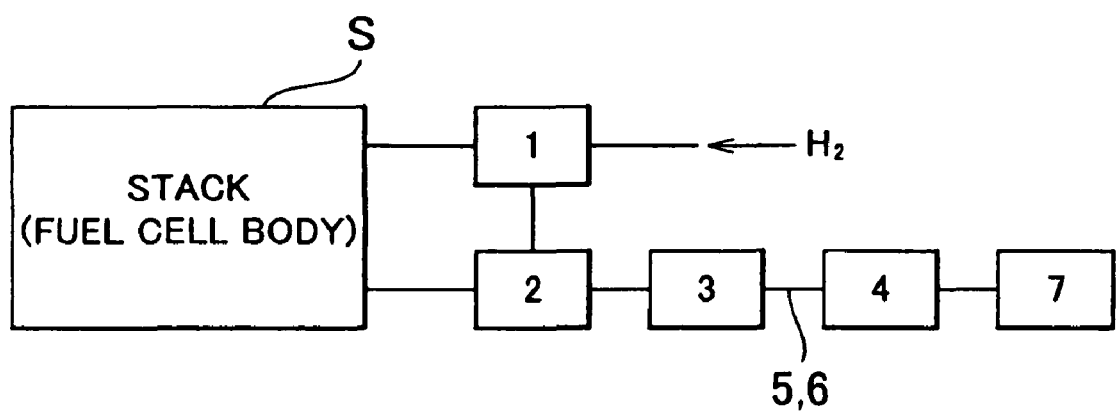
FIG. 1 is a schematic view that illustrates a fuel cell system of an embodiment of the invention.
Figure 2:
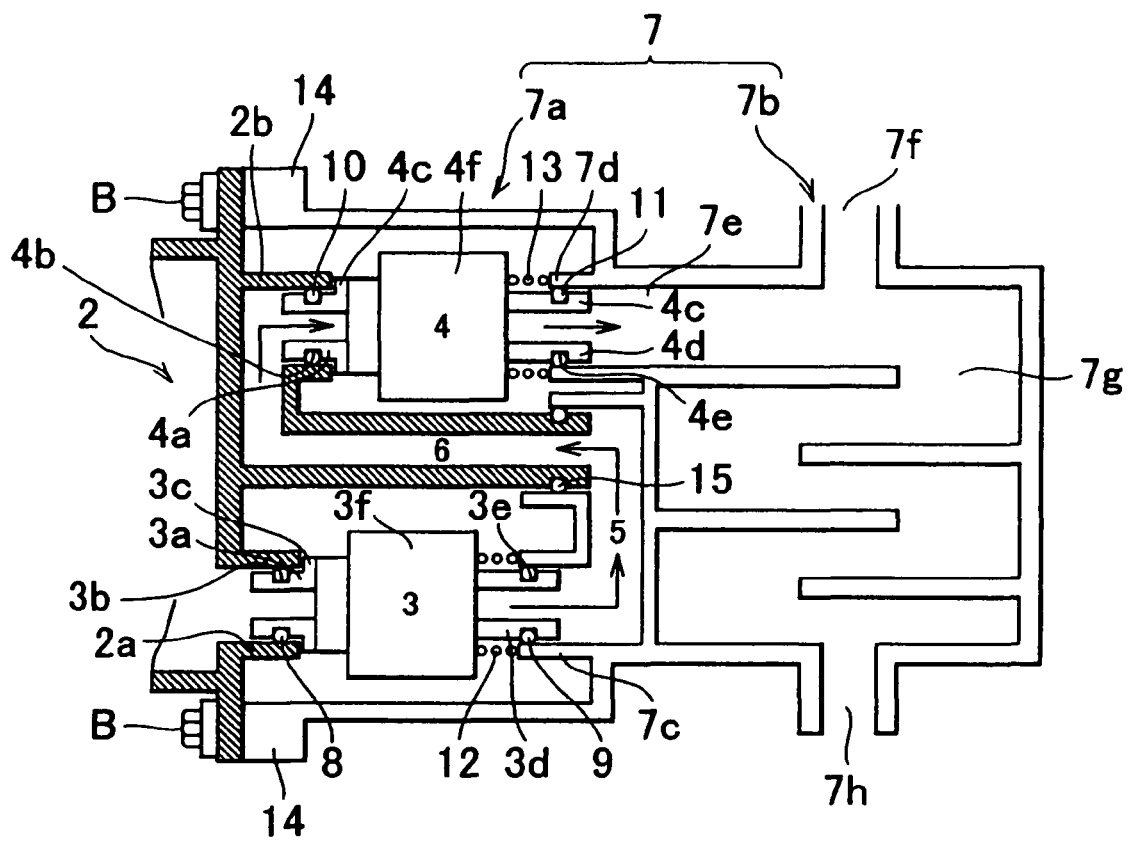
FIG. 2 illustrates an example of the fuel cell system of the embodiment of the invention in which an exhaust valve is disposed between a gas-liquid separation unit and a hydrogen processing unit.

As is apparent from FIGS. 1 and 2, a fuel cell system 20 of the embodiment includes a circulation device 1; a gas-liquid separation unit 2 (which corresponds to a first portion of the invention); exhaust valves 3 and 4 (which correspond to a hydrogen exhaust valve of the invention) that are controlled to open and close by a control device (not shown), like an ECU; connecting passages 5 and 6; a hydrogen processing unit 7 (that corresponds to a second portion of the invention); seals 8 to 11 and 15; spring members 12 and 13; and a fixed portion 14.

The circulation device 1 circulates fluid from a hydrogen electrode side of a stack S of the fuel cell body. Hydrogen supplied from a hydrogen tank (not shown) and hydrogen from the gas-liquid separation unit 2 obtained by separation is mixed, and then supplied to the stack S disposed downstream from the circulation device 1.

The gas-liquid separation unit 2 separates inflowing exhaust gas from the hydrogen electrode side of the stack S into gas and liquids. The gas-liquid separation unit 2 has a hydrogen outlet port 2a from which separated out hydrogen (note that, water, impurities, and the like, are mixed in with this hydrogen) is exhausted.

The hydrogen processing unit 7 processes the exhausted hydrogen, and is, for example, a dilution unit or a combustion unit. In this embodiment, an example using a dilution unit will be described. The dilution unit 7 has a cover 7a and a gas passage 7b. The exhaust valves 3 and 4, and the connection passages 5 and 6 are housed within an internal space formed beneath the cover 7a; and the gas passage 7b is formed integrally with the cover 7a. The dilution unit 7 is directly fixed by screw fitting to the gas-liquid separation unit 2 by inserting a bolt B into the fixed portion 14 such that the gas-liquid separation unit 2 closes the internal space beneath the cover 7a (refer to FIG. 2).

Next, the inter-connections of the elements within the internal space of the cover 7a will be described. As can be seen from FIG. 2, the exhaust valves 3 and 4 and the connection passages 5 and 6 are disposed within the internal space of the cover 7a. These elements form a passage for hydrogen which is separated out by the gas-liquid separation unit 2 and which flows in via the hydrogen outlet port 2a. The separated out hydrogen passes along this passage and eventually flows out from the cover 7a via a hydrogen outlet port 7d provide at a inner side of the cover 7a.

The exhaust valve 3 is fixedly disposed between the gas-liquid separation unit 2 and the cover 7a by inserting (or fitting) a gas inlet port 3a and an outlet port 3d of the exhaust valve 3 into, respectively, the hydrogen outlet port (exhaust valve attachment port) 2a of the gas-liquid separation unit 2 and an inlet port (exhaust valve attachment port) 7c of the connection passage 5 at the inner side of the cover 7a. It should be noted that the hydrogen outlet port (exhaust valve attachment port) 2a of the gas-liquid separation unit 2 is coaxial with the inlet port (exhaust valve attachment port) 7c.

A groove 3b is formed in the surface of the gas inlet port 3a of the exhaust valve 3 and extends in a circumferential direction thereof. An O-ring 8 made of an elastic material like rubber is fitted in the groove 3b and protrudes slightly therefrom. The O-ring 8 acts as a seal. Accordingly, the exhaust valve 3 is configured such that the gas inlet port 3a is inserted into the hydrogen outlet port (exhaust valve attachment port) 2a of the gas-liquid separation unit 2, whereby the O-ring 8 functions as a contacting seal with the inner wall of the hydrogen outlet port (exhaust valve attachment port) 2a.

Similarly, a groove 3e is formed in the surface of the outlet port 3d of the exhaust valve 3 and extends in a circumferential direction thereof. An O-ring 9 made of an elastic material like rubber is fitted in the groove 3e and protrudes slightly therefrom. The O-ring 9 functions as a seal. Accordingly, the exhaust valve 3 is configured such that the outlet port 3d is inserted into the inlet port (exhaust valve attachment port) 7c of the connection passage 5, whereby the O-ring 9 functions as a contacting seal with the inner wall of the inlet port (exhaust valve attachment port) 7c of the connection passage 5.

Moreover, by fitting the exhaust valve 3 using the O-rings 8 and 9 made of elastic material in the above described manner, it is possible to allow tolerance to absorb various kinds of assembly errors.

Moreover, a spring member 12 (like a coil spring) is disposed in an elastically deformed state between the inlet port (exhaust valve attachment port) 7c of the connection passage 5 and an exhaust valve body 3f. Accordingly, the spring member 12 exerts a return force towards its original shape, and urges the exhaust valve 3 in the direction toward the left side of FIG. 2. However, a stepped portion 3c is formed in the gas inlet port 3a of the exhaust valve 3, and this stepped portion 3c abuts with the hydrogen outlet port (exhaust valve attachment port) 2a of the gas-liquid separation unit 2. As a result, the exhaust valve 3 is fixedly disposed between the gas-liquid separation unit 2 and the cover 7a.

The exhaust valve 4 is fixedly disposed between the gas-liquid separation unit 2 and the cover 7a by inserting (or fitting) a gas inlet port 4a and an outlet port 4d into, respectively, an outlet port (exhaust valve attachment port) 2b of the connection passage 6 and the hydrogen outlet port (exhaust valve attachment port) 7d of the inner side of the cover 7a. It should be noted that the outlet port (exhaust valve attachment port) 2b of the connection passage 6 is coaxial with the hydrogen outlet port (exhaust valve attachment port) 7d of the inner side of the cover 7a.

A groove 4b is formed in the surface of the gas inlet port 4a of the exhaust valve 4 and extends in a circumferential direction thereof. An O-ring 10, which is made of an elastic material like rubber, is fitted in the groove 4b so as to protrude slightly from the surface. The O-ring 10 acts as a seal. Accordingly, the exhaust valve 4 is configured such that the gas inlet port 4a is inserted in the outlet port (exhaust valve attachment port) 2b of the connection passage 6, whereby the O-ring 10 functions as a contacting seal with the inner wall of the outlet port (exhaust valve attachment port) 2b of the connection passage 6.

Similarly, a groove 4e is formed in the surface of the outlet port 4d of the exhaust valve 4 and extends in a circumferential direction thereof. An O-ring 11 made of an elastic material like rubber is fitted in the groove 4e and protrudes slightly therefrom. The O-ring 11 functions as a seal. Accordingly, the exhaust valve 4 is configured such that the outlet port 4d is inserted into the hydrogen outlet port (exhaust valve attachment port) 7d of the inner side of the cover 7a, whereby the O-ring 11 functions as a contacting seal with the inner wall of the hydrogen outlet port (exhaust valve attachment port) 7d.

Moreover, by fitting the exhaust valve 4 using the O-rings 10 and 11 made of elastic material in the above described manner, it is possible to allow tolerance to absorb various kinds of assembly deviations.

Moreover, a spring member 13 (like a coil spring) is disposed in an elastically deformed state between the hydrogen outlet port (exhaust valve attachment port) 7d and an exhaust valve body 4f. Accordingly, the spring member 13 exerts a return force towards its original shape, and urges the exhaust valve 4 in the direction toward the left side of FIG. 2. However, a stepped portion 4c is formed in the inlet port 4a of the exhaust valve 4, and this stepped portion 4c abuts with the outlet port (exhaust valve attachment port) 2b of the connection passage 6. As a result, the exhaust valve 4 is fixedly disposed between the gas-liquid separation unit 2 and the cover 7a.

The exhaust valves 3 and 4 are connected via: the outlet port 3d of the exhaust valve 3; the connection passage 5 extending along the inner side of the cover 7a; the connection passage 6 that extends in the axial direction of the exhaust valves 3 and 4 as far as gas-liquid separation unit 2, and then extends along the side of the gas-liquid separation unit 2; and then the inlet port 4a of the exhaust valve 4.

Accordingly, the passage for the hydrogen which is separated out by the gas-liquid separation unit 2 and which flows in via the hydrogen outlet port 2a is formed in the internal space of the cover 7a. The separated out hydrogen passes along this passage and eventually flows out from the cover 7a via the hydrogen outlet port 7d provided at the inner side of the cover 7a.

Note that, the connection passage 6 and the connection passage 5 are respectively formed at the gas-liquid separation unit 2 and the dilution unit 7 sides, and, as described previously, the gas-liquid separation unit 2 and the dilution unit 7 are directly fixed to each other by screw fitting. Accordingly, the connection passages 5 and 6 are inter-connected and form the passage for the separated out hydrogen. An O-ring 15 is provided in order to ensure sealing between the two connection passages 5 and 6.

Next, the gas passage 7b will be described. The gas passage 7b is provided with an inlet port 7e, an inlet port 7f, a passage 7g, and an outlet port 7h. The inlet port 7e receives separated out hydrogen, and the inlet port 7f receives exhaust gas from an air electrode side of the stack S. Further, the hydrogen, etc., that inflows from the inlet ports 7f and 7e is mixed in the passage 7g. This mixed hydrogen, etc., then flows out through the outlet port 7h. As a result of this configuration, the hydrogen which includes mixed-in impurities, etc., is discharged to the outside environment after its concentration has been diluted by mixing with air.

In the fuel cell system of this embodiment, after start up of the fuel cell, the gas-liquid separation unit 2 is continuously supplied with heat (so long as the fuel cell is operating) by inflowing exhaust gas from the hydrogen electrode of the stack S that has been heated by an amount corresponding to the heat liberated by the stack S. Similarly, after start up the fuel cell, the dilution unit 7 is continuously supplied with heat (so long as the fuel cell is operating) from the exhaust gases from the air electrode side and the hydrogen electrode side of the stack S that have been heated by an amount corresponding to the heat liberated by the stack S.

With the above described configuration, the exhaust valves 3 and 4 are disposed within a space surrounded by the gas-liquid separation unit 2 and the dilution unit 7 that are supplied with heat from the exhaust gases from the stack (fuel cell main body) S after start up of the fuel cell. Accordingly, when the fuel cell is started up in low temperature environments, even if there is frozen water within the exhaust valves 3 and 4, it is possible for it to be thawed. Thus, there is no need to provide any special passages or perform control for thawing. Moreover, in the case that the water within the exhaust valves 3 and 4 is on the point of freezing, it is possible to stop freezing from taking place.

Further, with the fuel cell system of the embodiment, the number of fixed points is relatively small, and thus assembly time can be reduced. Similarly, for the same reason, the volume required for fixing is reduced, whereby the fuel cell system can be made smaller. Moreover, since the number of members like pipes and flanges (which have a larger surface area) that promote heat radiation is reduced, it is possible to inhibit freezing from taking place in low temperature environments.

Figure 3:
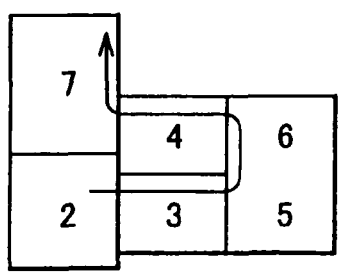
FIG. 3 is a schematic view that illustrates a first modified example of the fuel cell system of the embodiment of the invention.

In the above explanation of the fuel cell system of this embodiment, the exhaust valves 3 and 4 are disposed in the internal space surrounded by the gas-liquid separation unit 2 and the dilution unit 7. However, the invention is not limited to this configuration. For example, FIG. 3 shows a schematic view of a first modified example, in which the gas-liquid separation unit 2 and the hydrogen processing unit 7 (for example, the dilution unit), are directly fixed to each other, and the exhaust valves 3 and 4 are disposed to be adjacent with the gas-liquid separation unit 2 and the hydrogen processing unit 7, respectively. If this configuration is adopted, it is possible to realize the same effects as when the exhaust valves 3 and 4 are disposed in the area surrounded by the gas-liquid separation unit 2 and the dilution unit 7.

Figure 4:
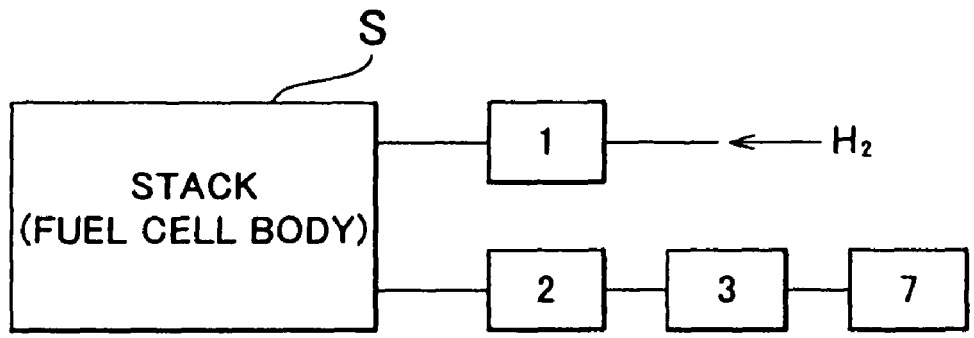
FIG. 4 is a schematic view that illustrates a second modified example of the fuel cell system of the embodiment of the invention.
Figure 5:
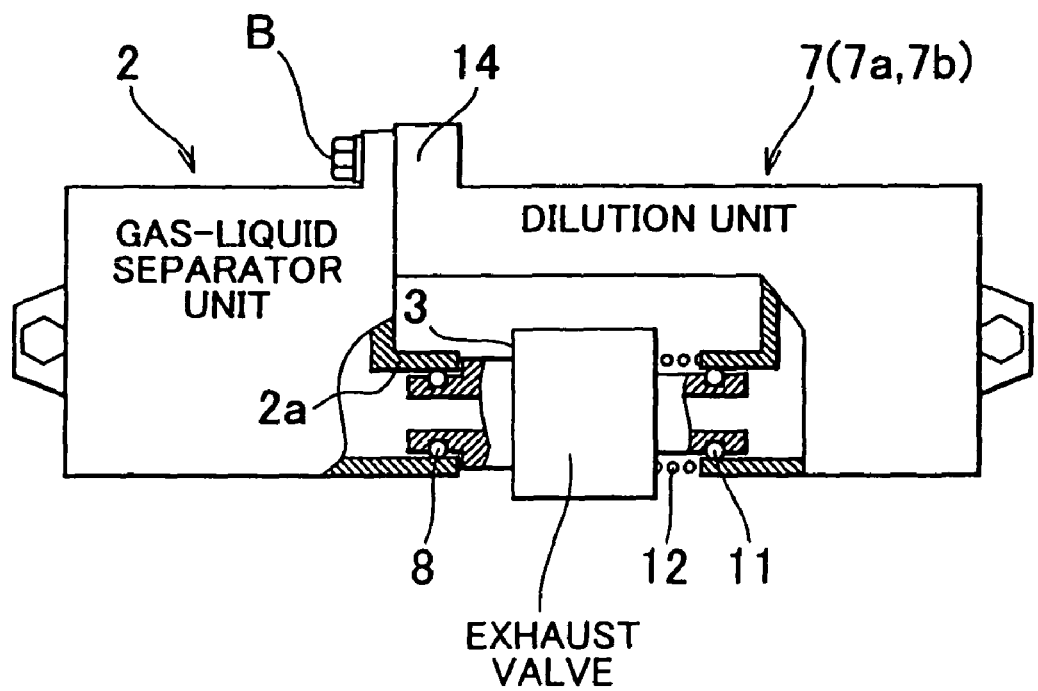
FIG. 5 illustrates an example of the second modified example of the fuel cell system of the embodiment of the invention in which the exhaust valve is disposed between the gas-liquid separation unit and the hydrogen processing unit.
Figure 6:
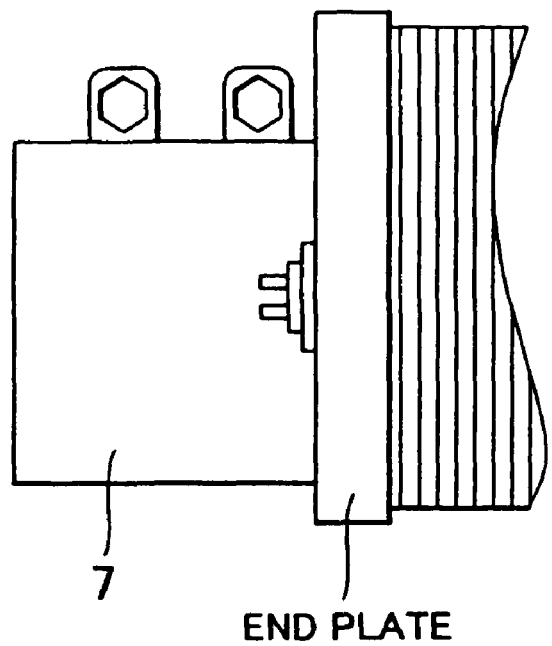
FIG. 6 shows the gas-liquid separation unit and the hydrogen processing unit of FIG. 5 when viewed from the center right side of FIG. 5.

Moreover, in the above explanation of the fuel cell system of this embodiment, two exhaust valves, namely, the exhaust valves 3 and 4, are disposed in the space surrounded by the gas-liquid separation unit 2 and the dilution unit 7. However, the invention is no way limited to this configuration. For example, just one exhaust valve, or more than two exhaust valves, may be provided. For example, FIGS. 4 to 6 show a second modified example including one exhaust valve. Note that, structural members of the configuration shown in FIGS. 4 to 6 that are the same as those of the previously described embodiment are denoted with the same reference numerals, and an explanation thereof is omitted.

Figure 7:
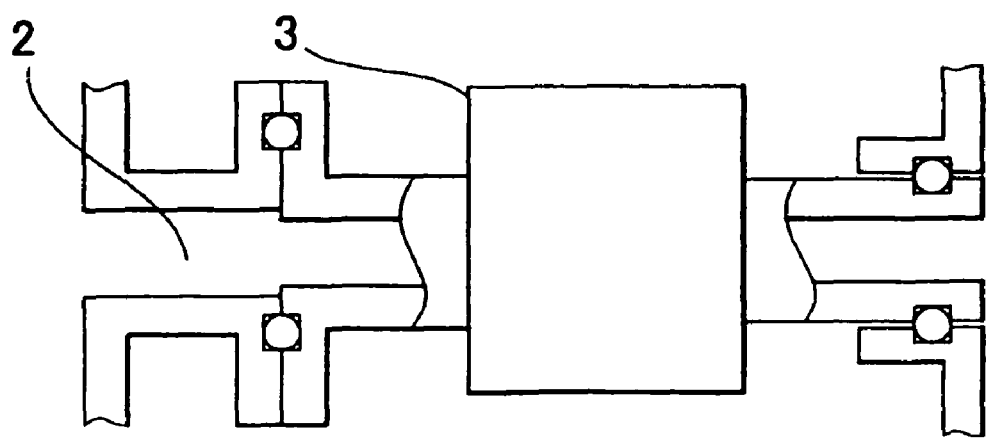
FIG. 7 illustrates the attachment method used to attach the exhaust value in a third modified example of the fuel cell system of the embodiment of the invention.

Further, in the above explanation of the fuel cell system of this embodiment, the exhaust valves 3 and 4 are fixed by the spring members 12 and 13. However, the invention is not limited to this configuration. For example, in a third modified example shown in FIG. 7, the spring member is disused on one side of the exhaust valve 3, and a sealing method is adopted that utilizes surface sealing and flange fixing (the same explanation applies to the exhaust valve 4).

Moreover, in the above explanation of the fuel cell system of this embodiment, the hydrogen processing unit (dilution unit) 7 and the gas-liquid separation unit 2 are directly fixed to each other, with the internal space of the cover 7a being closed by the gas-liquid separation unit 2. However, the invention is not limited to this configuration. For example, in place of the gas-liquid separation unit 2, an end plate with is part of the stack S may be used to close the internal space of the cover 7a, and the hydrogen processing unit (dilution unit) 7 may be directly fixed to this end plate. This configuration is particularly favorable in the case of fuel cell systems that do not require a gas-liquid separation unit.

Moreover, although in the above explanation of the fuel cell system of this embodiment the hydrogen processing unit 7 is a dilution unit, the invention is not limited to this configuration. For example, the hydrogen processing unit 7 may be a combustion unit or another type of hydrogen processing device.

The invention may be embodied in a variety of other forms that incorporate the essential features thereof, without departing from the essence of the invention. Accordingly, the above described embodiments are purely illustrative, and should not be taken to restrict the scope of the invention in any manner whatsoever.

According to the invention it is possible to utilize a relatively simple configuration in order to thaw a frozen exhaust valve when starting up a fuel cell (and, to prevent freezing of the exhaust valve if it is about to freeze).

The invention provides a fuel cell system including a fuel cell body; a first portion continuously supplied with heat following start up of the fuel cell body; a second portion continuously supplied with heat following start up of the fuel cell body; and a hydrogen exhaust valve. The first portion and the second portion are directly fixed to each other with the hydrogen exhaust valve disposed therebetween. The first portion is, for example, a gas-liquid separation unit supplied with heat from exhaust gas from the fuel cell body, and the second portion is, for example, a hydrogen processing unit supplied with heat from exhaust gas from the fuel cell body.

The invention claimed is:

1. A fuel cell system comprising:
   a fuel cell body;
   a first portion and a second portion which cooperate with each other to jointly form a passage for hydrogen exhausted from the fuel cell body;
   a hydrogen exhaust valve disposed in the passage between the first portion and the second portion; and
   a spring member interposed between the hydrogen exhaust valve and one of the first portion and the second portion to urge the hydrogen exhaust valve directly against the other one of the first portion and the second portion, wherein
      the first portion and the second portion are directly fixed to each other and are both continuously supplied with heat from the fuel cell body following start up of the fuel cell body, and
      the first portion includes at least one of a gas-liquid separation unit supplied with heat from inflowing exhaust gas from the fuel cell body and an end plate provided in a stack configured by the fuel cell body and supplied with heat liberated by the stack.

2. A fuel cell system according to claim 1, wherein the second portion is a hydrogen processing unit supplied with heat from inflowing exhaust gas from the fuel cell body.

3. A fuel cell system according to claim 2, wherein the hydrogen processing unit includes at least one of a dilution unit and a combustion unit.

4. A fuel cell system according to claim 1, wherein
   one of the first portion and the second portion includes a cover formed with an internal space that accommodates the hydrogen exhaust valve; and
   the other one of the first portion and the second portion closes the internal space of the cover within which the hydrogen exhaust valve is disposed.

5. A fuel cell system according to claim 1, wherein the hydrogen exhaust valve is fixed to the first portion and the second portion.

6. A fuel cell system comprising:
   a fuel cell body;
   a first portion and a second portion which cooperate with each other to jointly form a passage for hydrogen exhausted from the fuel cell body;
   a hydrogen exhaust valve disposed in the passage between the first portion and the second portion; and
   a spring member interposed between the hydrogen exhaust valve and one of the first portion and the second portion to urge the hydrogen exhaust valve directly against the other one of the first portion and the second portion, wherein
      the first portion and the second portion are directly fixed to each other and are both continuously supplied with heat from the fuel cell body following start up of the fuel cell body, and
      seal mechanisms are respectively interposed between the hydrogen exhaust valve and each of the first portion and the second portion.

7. A fuel cell system according to claim 6, wherein the second portion is a hydrogen processing unit supplied with heat from inflowing exhaust gas from the fuel cell body.

8. A fuel cell system according to claim 7, wherein the hydrogen processing unit includes at least one of a dilution unit and a combustion unit.

9. A fuel cell system according to claim 6, wherein
   one of the first portion and the second portion includes a cover formed with an internal space that accommodates the hydrogen exhaust valve; and
   the other one of the first portion and the second portion closes the internal space of the cover within which the hydrogen exhaust valve is disposed.

10. A fuel cell system according to claim 6, wherein the hydrogen exhaust valve is fixed to the first portion and the second portion.

* * * * *